(12) United States Patent
Walsh

(10) Patent No.: US 12,259,708 B2
(45) Date of Patent: Mar. 25, 2025

(54) APPARATUS AND METHOD FOR PRODUCING A 3D PART USING IMPLICIT REPRESENTATION

(71) Applicant: Markforged, Inc., Watertown, MA (US)

(72) Inventor: Corey Hazeltine Walsh, Belmont, MA (US)

(73) Assignee: Markforged, Inc., Waltham, MA (US)

( * ) Notice: Subject to any disclaimer, the term of this patent is extended or adjusted under 35 U.S.C. 154(b) by 242 days.

(21) Appl. No.: 17/715,069

(22) Filed: Apr. 7, 2022

(65) Prior Publication Data

US 2022/0334555 A1    Oct. 20, 2022

Related U.S. Application Data

(60) Provisional application No. 63/175,924, filed on Apr. 16, 2021.

(51) Int. Cl.
*G05B 19/4099* (2006.01)
*G05B 19/18* (2006.01)
*G05B 19/4093* (2006.01)

(52) U.S. Cl.
CPC ...... *G05B 19/4099* (2013.01); *G05B 19/182* (2013.01); *G05B 19/40938* (2013.01)

(58) Field of Classification Search
CPC ..... B29C 64/386; B33Y 50/00; G05B 19/182; G05B 19/40931; G05B 19/40938; G05B 19/4099; G05B 19/4145; G05B 2219/35151

USPC .......................................................... 700/98
See application file for complete search history.

(56) References Cited

U.S. PATENT DOCUMENTS

| | | |
|---|---|---|
| 9,149,988 B2 | 10/2015 | Mark et al. |
| 9,186,846 B1 | 11/2015 | Mark et al. |
| 9,186,848 B2 | 11/2015 | Mark et al. |
| 9,370,896 B2 | 6/2016 | Mark |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,815,268 B2 | 11/2017 | Mark et al. |
| 10,000,011 B1 | 6/2018 | Mark |
| 10,076,876 B2 | 9/2018 | Mark et al. |
| 10,464,131 B2 | 11/2019 | Mark |
| 10,800,108 B2 | 10/2020 | Mark et al. |

(Continued)

OTHER PUBLICATIONS

U.S. Appl. No. 63/138,987, filed Jan. 19, 2021 (first named inventor: Bruce David Jones).

(Continued)

*Primary Examiner* — Chun Cao
(74) *Attorney, Agent, or Firm* — Venable LLP

(57) ABSTRACT

A 3D production apparatus and method that receives a 3D production file, the 3D production file containing at least one positional command defined based on an implicit representation, the at least one positional command including at least one parameter of the implicit representation. At least one tool command is generated based on the parameters of the implicit representation. A position of a tool is controlled based on the generated at least one tool command, to produce at least a portion of a 3D part corresponding to the 3D production file.

36 Claims, 17 Drawing Sheets

(56) References Cited

U.S. PATENT DOCUMENTS

| | | |
|---|---|---|
| 10,814,558 B2 | 10/2020 | Parangi |
| 10,828,698 B2 | 11/2020 | Mark |
| 10,953,609 B1 | 3/2021 | Mark |
| 2013/0297059 A1* | 11/2013 | Grifith .................. B29C 64/386 |
| | | 700/98 |
| 2014/0297014 A1 | 10/2014 | Iverson et al. |
| 2016/0107379 A1 | 4/2016 | Mark et al. |
| 2018/0133969 A1* | 5/2018 | Huang .................. B29C 64/171 |
| 2018/0157243 A1 | 6/2018 | Michopoulos et al. |
| 2019/0009472 A1 | 1/2019 | Mark |
| 2020/0114422 A1 | 4/2020 | Mark et al. |
| 2020/0361155 A1 | 11/2020 | Jones et al. |
| 2020/0371509 A1 | 11/2020 | Mark |
| 2023/0116685 A1* | 4/2023 | Llamazares ........... B29C 64/124 |
| | | 425/472 |

OTHER PUBLICATIONS

Sam Whitehead, Triply Periodic Minimal Surfaces, https://wewanttolearn.wordpress.com/2019/02/03/triply-periodic-minimal surfaces/ (Feb. 3, 2019).

Examination Report dated Jan. 17, 2024, in European Patent Application No. 22167113.4.

Search Report dated Sep. 9, 2022, in European Patent Application No. 22167113.4.

* cited by examiner

| X | Y |
|---|---|
| -15.269 | -33.474 |
| -15.387 | -33.298 |
| -15.495 | -33.186 |
| -15.726 | -32.866 |
| -15.74 | -32.466 |
| -15.525 | -32.126 |
| -15.276 | -31.826 |
| -15.216 | -31.446 |
| -15.387 | -31.086 |
| -15.495 | -30.973 |
| -15.726 | -30.653 |
| -15.74 | -30.253 |
| -15.525 | -29.913 |
| -15.276 | -29.613 |
| -15.216 | -29.233 |
| -15.387 | -28.873 |
| -15.495 | -28.761 |
| -15.726 | -28.441 |
| -15.74 | -28.041 |
| -15.525 | -27.701 |
| -15.276 | -27.401 |
| -15.216 | -27.021 |
| -15.387 | -26.661 |
| -15.495 | -26.549 |
| -15.726 | -26.229 |
| -15.74 | -25.829 |
| -15.525 | -25.489 |
| -15.276 | -25.189 |
| -15.216 | -24.809 |
| -15.387 | -24.449 |
| -15.495 | -24.336 |
| -15.726 | -24.016 |
| -15.74 | -23.616 |
| -15.525 | -23.276 |
| -15.276 | -22.976 |
| -15.216 | -22.596 |
| -15.387 | -22.236 |
| -15.495 | -22.124 |
| -15.726 | -21.804 |
| -15.74 | -21.404 |
| -15.525 | -21.064 |
| -15.276 | -20.764 |
| -15.216 | -20.384 |
| -15.387 | -20.024 |
| -15.495 | -19.912 |
| -15.726 | -19.592 |
| -15.74 | -19.192 |
| -15.525 | -18.852 |
| -15.276 | -18.552 |
| -15.216 | -18.172 |
| -15.387 | -17.812 |
| -15.495 | -17.699 |
| -15.726 | -17.379 |
| -15.74 | -16.979 |
| -15.525 | -16.639 |
| -15.276 | -16.339 |
| -15.216 | -15.959 |
| -15.387 | -15.599 |
| -15.495 | -15.487 |
| -15.726 | -15.167 |
| -15.74 | -14.767 |
| -15.525 | -14.427 |
| -15.276 | -14.127 |
| -15.216 | -13.747 |
| -15.387 | -13.387 |
| -15.495 | -13.274 |
| -15.726 | -12.954 |
| -15.74 | -12.554 |
| -15.525 | -12.214 |
| -15.276 | -11.914 |
| -15.216 | -11.534 |
| -15.387 | -11.174 |
| -15.495 | -11.062 |
| -15.726 | -10.742 |
| -15.74 | -10.342 |
| -15.525 | -10.002 |
| -15.276 | -9.702 |
| -15.216 | -9.322 |
| -15.387 | -8.962 |
| -15.495 | -8.85 |
| -15.726 | -8.53 |
| -15.74 | -8.13 |
| -15.525 | -7.79 |
| -15.276 | -7.49 |
| -15.216 | -7.11 |
| -15.387 | -6.75 |
| -15.495 | -6.637 |
| -15.726 | -6.317 |
| -15.74 | -5.917 |
| -15.525 | -5.577 |
| -15.276 | -5.277 |
| -15.216 | -4.897 |
| -15.387 | -4.537 |
| -15.495 | -4.425 |
| -15.726 | -4.105 |
| -15.74 | -3.705 |
| -15.525 | -3.365 |
| -15.276 | -3.065 |
| -15.216 | -2.685 |
| -15.387 | -2.325 |
| -15.495 | -2.212 |
| -15.726 | -1.892 |
| -15.74 | -1.492 |
| -15.525 | -1.152 |
| -15.276 | -0.852 |
| -15.216 | -0.472 |
| -15.387 | -0.112 |
| -15.495 | 0 |
| -15.726 | 0.32 |
| -15.74 | 0.72 |
| -15.525 | 1.06 |
| -15.276 | 1.36 |
| -15.216 | 1.74 |
| -15.387 | 2.1 |
| -15.495 | 2.212 |
| -15.726 | 2.532 |
| -15.74 | 2.932 |
| -15.525 | 3.272 |
| -15.276 | 3.572 |
| -15.216 | 3.952 |
| -15.387 | 4.312 |
| -15.495 | 4.425 |
| -15.726 | 4.745 |
| -15.74 | 5.145 |
| -15.525 | 5.485 |
| -15.276 | 5.785 |
| -15.216 | 6.165 |
| -15.387 | 6.525 |
| -15.495 | 6.637 |
| -15.726 | 6.957 |
| -15.74 | 7.357 |
| -15.525 | 7.697 |
| -15.276 | 7.997 |
| -15.216 | 8.377 |
| -15.387 | 8.737 |
| -15.495 | 8.85 |
| -15.726 | 9.17 |
| -15.74 | 9.57 |
| -15.525 | 9.91 |
| -15.276 | 10.21 |
| -15.216 | 10.59 |
| -15.387 | 10.95 |
| -15.495 | 11.062 |
| -15.726 | 11.382 |
| -15.74 | 11.782 |
| -15.525 | 12.122 |
| -15.276 | 12.422 |
| -15.216 | 12.802 |
| -15.387 | 13.162 |
| -15.495 | 13.274 |
| -15.726 | 13.594 |
| -15.74 | 13.994 |
| -15.525 | 14.334 |
| -15.276 | 14.634 |
| -15.216 | 15.014 |
| -15.387 | 15.374 |
| -15.495 | 15.487 |
| -15.726 | 15.807 |
| -15.74 | 16.207 |
| -15.525 | 16.547 |
| -15.276 | 16.847 |
| -15.216 | 17.227 |
| -15.387 | 17.587 |
| -15.495 | 17.699 |
| -15.726 | 18.019 |
| -15.74 | 18.419 |
| -15.525 | 18.759 |
| -15.276 | 19.059 |
| -15.216 | 19.439 |
| -15.387 | 19.799 |
| -15.495 | 19.912 |
| -15.726 | 20.232 |
| -15.74 | 20.632 |
| -15.525 | 20.972 |
| -15.276 | 21.272 |
| -15.216 | 21.652 |
| -15.387 | 22.012 |
| -15.495 | 22.124 |
| -15.726 | 22.444 |
| -15.74 | 22.844 |
| -15.525 | 23.184 |
| -15.276 | 23.484 |
| -15.216 | 23.864 |
| -15.387 | 24.224 |
| -15.495 | 24.336 |
| -15.726 | 24.656 |
| -15.74 | 25.056 |
| -15.525 | 25.396 |
| -15.276 | 25.696 |
| -15.216 | 26.076 |
| -15.387 | 26.436 |
| -15.495 | 26.549 |
| -15.726 | 26.869 |
| -15.74 | 27.269 |
| -15.525 | 27.609 |
| -15.276 | 27.909 |
| -15.216 | 28.289 |
| -15.387 | 28.649 |
| -15.495 | 28.761 |
| -15.726 | 29.081 |
| -15.74 | 29.481 |
| -15.525 | 29.821 |
| -15.276 | 30.121 |
| -15.216 | 30.501 |
| -15.387 | 30.861 |
| -15.495 | 30.973 |
| -15.726 | 31.293 |
| -15.74 | 31.693 |
| -15.525 | 32.033 |
| -15.276 | 32.333 |
| -15.216 | 32.713 |
| -15.387 | 33.073 |
| -15.495 | 33.186 |
| -15.713 | 33.474 |

FIG. 5A   PRIOR ART

```
{
  "params": {
    "zHeight": 0.02221522823512334,
    "xyScale": 2.84,
    "offsetIdx": -14,
  },
  "2dTransformation": [1, 0, 0, 0, 1, 0, 0, 0, 1],
  "tBounds": [
    -33.473996,
    33.473996
  ]
}
```

FIG. 6A

```
{
  "pathType": "GyroidCurveV1",
  "params": {
    "zHeight": 0.02221522823512334,
    "xyScale": 2.84,
    "offsetIdx": -14,
    "stepSize": 0.4,
    "minStepSize": 0.02
  },
  "2dTransformation": [1, 0, 0, 0, 1, 0, 0, 0, 1],
  "tBounds": [
    -33.473996,
    33.473996
  ]
}
```

FIG. 6B

APPARATUS AND METHOD FOR PRODUCING A 3D PART USING IMPLICIT REPRESENTATION

This application claims the benefit of U.S. Provisional Patent Application No. 63/175,924, filed Apr. 16, 2021, and titled "Apparatus and Method for Producing a 3D Part Using Implicit Representation," the entirety of which is incorporated herein by reference.

FIELD OF THE INVENTION

The invention relates to an apparatus and method for producing a 3D part based on a 3D production file storing information based on implicit representation.

BACKGROUND OF THE INVENTION

To produce a 3D part, a 3D production apparatus often receives a 3D production data file corresponding to the 3D part. The data file generally contains a sequence of commands for execution by the apparatus to produce the 3D part. For instance, in an additive production method, an apparatus (e.g., 3D printer) receives and a 3D print file containing commands (e.g., for motion, filament deposition, and other component controls) for execution by the apparatus to form the 3D part. Similarly, in a subtractive production method, an apparatus (e.g., CNC machine) receives a CNC file containing commands (e.g., for motion, machining, and other component controls) for execution by the apparatus to form the 3D part.

As noted, these 3D production data files generally contain instructions for controlling the operation of motion and material-working (e.g., tool) components within the 3D production apparatus. Typically, the motion control instructions are defined as an iterative sequence of small segments, such as straight lines and arcs, for the movement. For instance, the segments may define linear/arcuate motion for an apparatus component that is responsible for adding or subtracting material to form the 3D part. Typically, aggregate movement definition based on the sequence of straight lines and arcs is known as a "piecewise" (e.g., piecewise-linear or piecewise-arcuate) representation.

Since large quantities of piecewise segments are stored in a production data file, these files can become voluminous in size (e.g., hundreds of megabytes or greater). Although file compression may be applied to reduce this file size, these files can still be voluminous even post-compression.

Additionally, when using piecewise representation, the number of segments scales linearly with the length of the movement, since more segments are required to define the movement. Therefore, the file size for 3D parts that require longer stretches of component movement for production, will generally increase under piecewise representation, compared to that for 3D parts requiring only shorter stretches of component movement for production.

Therefore, a need in the art exists to reduce the file size of 3D production files for 3D production apparatuses, without degrading the representation of the 3D product in the file.

SUMMARY OF THE INVENTION

One aspect of the present invention relates to an apparatus comprising at least one processor, and at least one memory, wherein the at least one memory stores computer-readable instructions which, when executed by the at least one processor, cause the processor to: receive a 3D production file, the 3D production file containing at least one positional command defined based on an implicit representation, the at least one positional command including at least one parameter of the implicit representation, generate at least one tool command based on the parameters of the implicit representation, and control a position of a tool, based on the generated at least one tool command, to produce at least a portion of a 3D part corresponding to the 3D production file.

Another aspect of the present invention relates to a method comprising: receiving, by at least one processor, a 3D production file, the 3D production file containing at least one positional command defined based on an implicit representation, the at least one positional command including at least one parameter of the implicit representation, generating, by the at least one processor, at least one tool command based on the parameters of the implicit representation, and controlling, by the at least one processor, a position of a tool, based on the generated at least one tool command, to produce at least a portion of a 3D part corresponding to the 3D production file.

These and other aspects of the invention will become apparent from the following disclosure.

BRIEF DESCRIPTION OF THE DRAWINGS

FIG. 5A illustrates X-Y data points for a Gyroid curve according to piecewise representation.

FIGS. 6A and 6B illustrate examples of implicit representations of Gyroid curves in a 3D production file, in accordance with one embodiment.

DETAILED DESCRIPTION OF THE PREFERRED EMBODIMENTS

Figure 1:
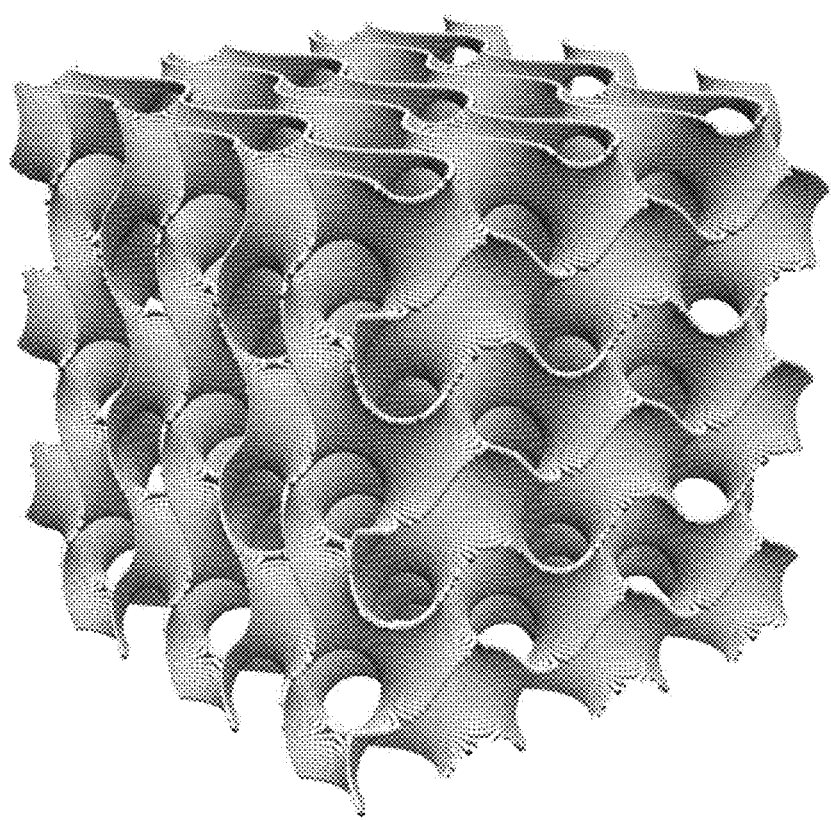
FIG. 1 illustrates a Gyroid structure that may be used to define an infill pattern for producing a 3D part, in accordance with one embodiment.

One aspect of the invention relates to the creation and use of a 3D production file that stores motion commands by an implicit representation which defines the motion.

Another aspect of the invention is the creation and use of a 3D printing file that stores motion (or more generically, positional) commands for an infill operation by storing parameters of a closed-form functional representation of a geometric structure which defines the motion. It will be appreciated that various geometric structures may be utilized to define the motion, although it is preferable that such geometric structures are definable as an implicit representation, such as using a closed-form mathematical representation, and more preferable that such implicit functional representation is not overly complex. It will also be appreciated that tradeoffs in processing and storage may exist between certain geometric structures which may have more complex implicit functional representations therefor (which may increase the file sizes required to store the corresponding parameters and require higher levels of processing) but which on the other hand may provide a greater fidelity of motion representation (e.g., for 3D printing infill).

Yet another aspect of the invention relates to a method for producing a 3D part that is based on a 3D production file that stores motion (or more generically, positional) commands by storing an implicit representation (e.g., parameters of a closed-form functional representation of a geometric structure) which defines the motion.

Yet another aspect of the invention relates to a 3D production apparatus that produces a 3D part based on a 3D production file that stores motion commands by storing an implicit representation (e.g., parameters of a closed-form functional representation of a geometric structure) which defines the motion.

3D Production File

Aspects of a 3D production file that may be used for the present invention will now be described. The file format for the file may differ from conventional 3D production file formats (e.g., 3D print files, CNC files) in that at least a subset of the motion commands within the file may be defined using an implicit representation rather than using a piecewise representation. For example, a subset of the motion commands within the file may be defined based on parameters of a closed-form functional representation of a geometric structure defining the motion, rather than based on a discretized sequence of piecewise segments defining the motion. In defining the motion command, the file stores these parameters of the closed-form functional representation, rather than storing the parameters of the piecewise segments.

It will be appreciated that such a closed-form functional representation can take various forms, including at least (but not limited to) a mathematical representation (e.g., one or more mathematical equations) and/or a non-mathematical representation (e.g., algorithmic).

In one aspect of the invention relating to 3D printing, the implicit representation may be used at least for motion commands used to define 3D infill. 3D infill is the concept of printing a pattern within a defined perimeter, to fill the space of the perimeter with the 3D printing material to produce a solid structure. One conventional approach that has been employed to define a motion command for 3D printing infill is piecewise representation. On the other hand, the present invention may utilize a 3D production file that defines a 3D infill command using an implicit representation (e.g., closed-form functional representation), with the 3D production file storing the mathematical equation parameters representing the geometrical structure rather than piecewise-linear segments collectively forming the structure.

The 3D production file used in the present invention may be created using design software, based on a design file (e.g., CAD file) defining the design of the 3D part to be produced. That is, the design software may convert such a design file (which may define the 3D part itself) to the 3D production file (which may define the actions to be taken by components of the 3D production apparatus for producing the 3D part). When performing the conversion, such design software may, rather than converting design properties of the 3D part to component actions defined using a piecewise representation, instead convert such design properties to component actions defined using an implicit representation. As one example, for a design file of a 3D part containing a region of solid volume, the design software may convert the solid volume region to a 3D printing infill pattern definable using an implicit representation, and may store the parameters of the implicit representation in a 3D print file.

It will be appreciated that a subset of the motion commands within the file may still be defined using piecewise representation, especially if the motion cannot adequately be implicitly represented using a geometric structure. The present invention may utilize the storage of motion commands within the file based on implicit representation, to reduce the size of the 3D production file without degrading the representation of the 3D part defined in the file.

Geometric Structures

The present invention may utilize various geometric structures having closed-form functional representations to define motion and store the parameters of the closed-form functional representations in a 3D production file. Non-limiting examples of these geometric structures will now be described. Although the descriptions focus on use of these geometric structures for 3D infill for 3D printing, it will be appreciated that the geometric structures may be similarly applicable towards other motion commands in 3D part production environments.

(i) Gyroid

A Gyroid is an example of a geometric structure that may be used for the invention, such as to define a pattern for infill in 3D printing. FIG. 1 illustrates an example of a Gyroid geometric structure.

A Gyroid structure has properties making it advantageous for use with the present invention, in that its geometry makes it especially suitable as a 3D printing infill pattern. First, a Gyroid is an isotropic open-cell structure, which allows liquid or gas to pass through the structure easily. This property is desirable for 3D printing in certain applications. For example, when performing a solvent debinding step, the open-cell characteristic permits liquid access to the interior of the geometric structure. Additionally, when performing a sintering step, the open-cell characteristic permits gas removal via the open-cell channels. Even further, the open-cell structure reduces the amount of material needed to provide the infill, thereby reducing the overall mass of the part and also reducing costs by reducing consumption of 3D printing material.

A Gyroid structure has additional properties making it advantageous for use in the present invention, in that its geometry may be represented in implicit form and the parameters of such implicit form may be stored as data for use with the methods and apparatuses described herein. In particular, a Gyroid may be defined according to a closed-form mathematical equation. Even more particularly, the three-dimensional geometric structure of a Gyroid may be defined as the solution to the following equation:

$$\cos(x) \times \sin(y) + \sin(z) \times \cos(y) + \cos(z) \times \sin(x) = 0$$

As such, the Gyroid geometric profile may be resolved by solving the Gyroid equation for particular "Gyroid curves"

that are continuous and defined by a small set of parameters. In turn, the profile of the Gyroid structure at a particular two-dimensional slice of the 3D part (e.g., particular Z height) may be resolved by solving the Gyroid equation for a particular height z.

Figure 2:
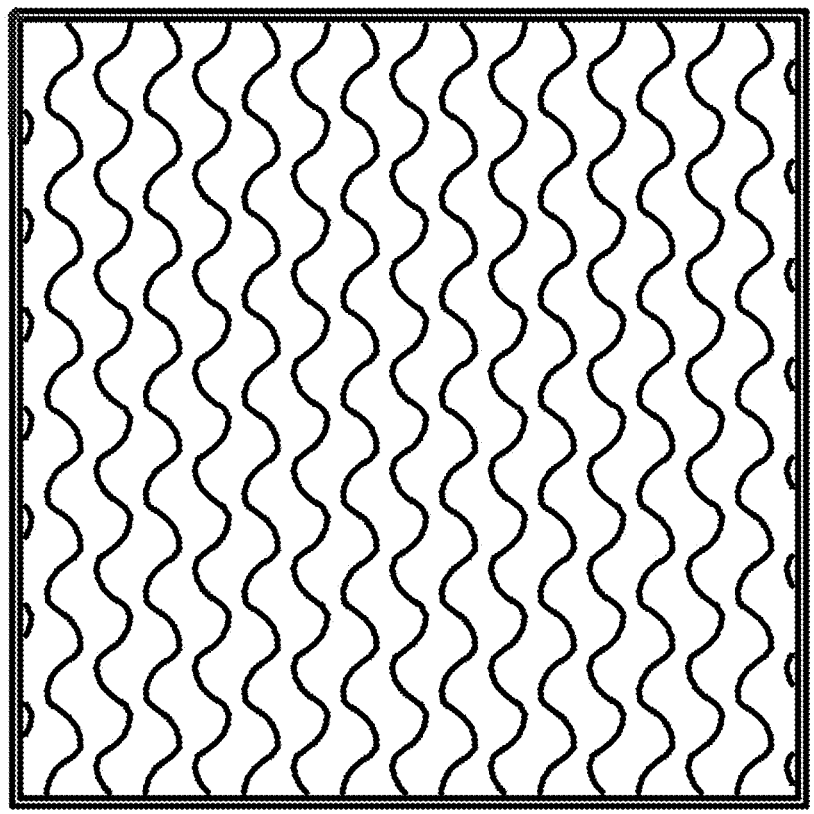
FIG. 2 illustrates a Gyroid infill pattern for a 3D production operation, in accordance with one embodiment.

FIG. 2 illustrates an example of a Gyroid infill pattern for a 3D printing layer at a two-dimensional slice through the Gyroid profile for a particular height z. As illustrated in FIG. 2, the Gyroid structure profile at the two-dimensional slice includes various curves spread throughout the infill area (which depicted in the example of FIG. 2 as a square).

Figure 3:
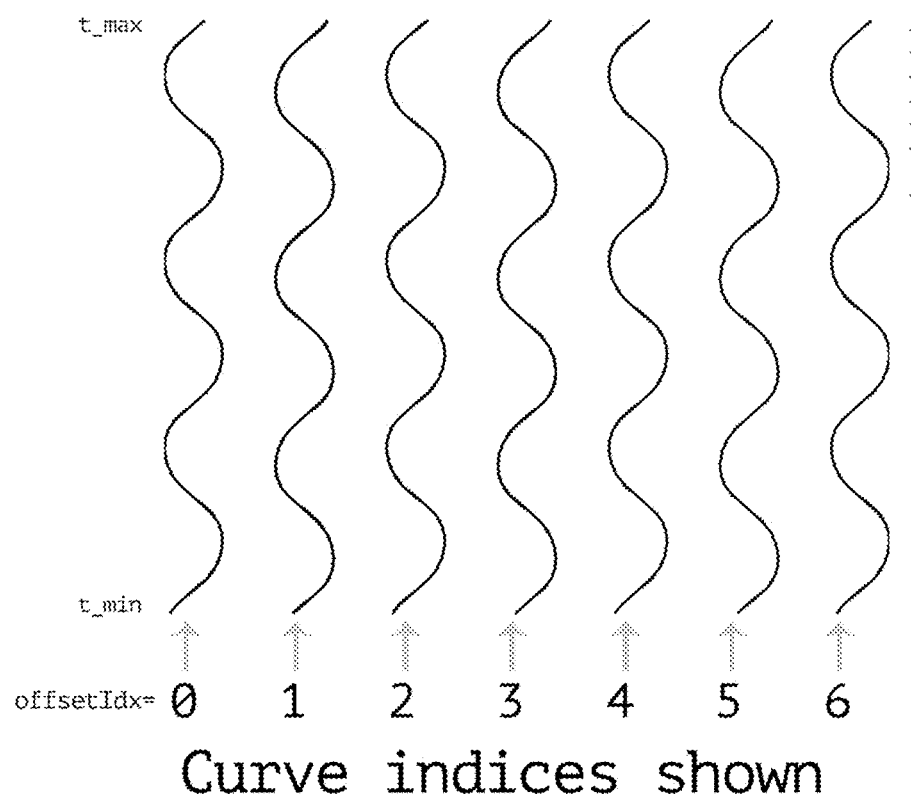
FIG. 3 illustrates configurations of different Gyroid curves that may be used for a two-dimensional slice of an infill pattern, in accordance with one embodiment.

FIG. 3 illustrates configurations of different Gyroid curves that may be used for a two-dimensional slice. As an example, an individual curve may be represented according to the following parameters:

| | |
|---|---|
| [t_min, t_max] | t bounds for the curve |
| offsetIdx | X offset along the X-axis for the curve |

In particular, t_min and t_max may define the bounds of each curve in the Y direction (e.g., "vertical" direction within the two-dimensional slice), while offsetIdx may define the offset of the curve in the X direction (e.g., "horizontal" direction within the two-dimensional slice).

Figure 4A:
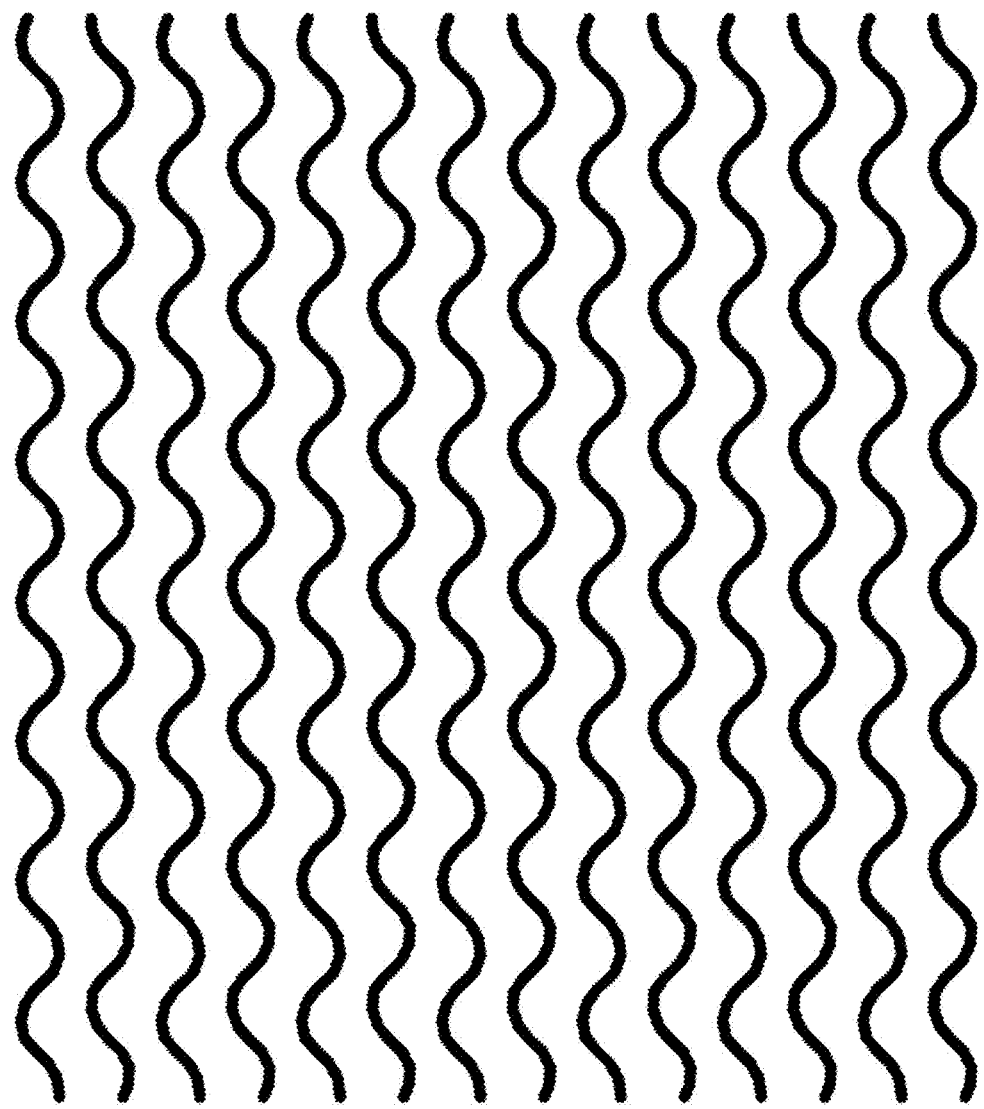
FIGS. 4A-4C illustrate examples of sets of curves forming two-dimensional slices for infill, in accordance with one embodiment.
Figure 4B:
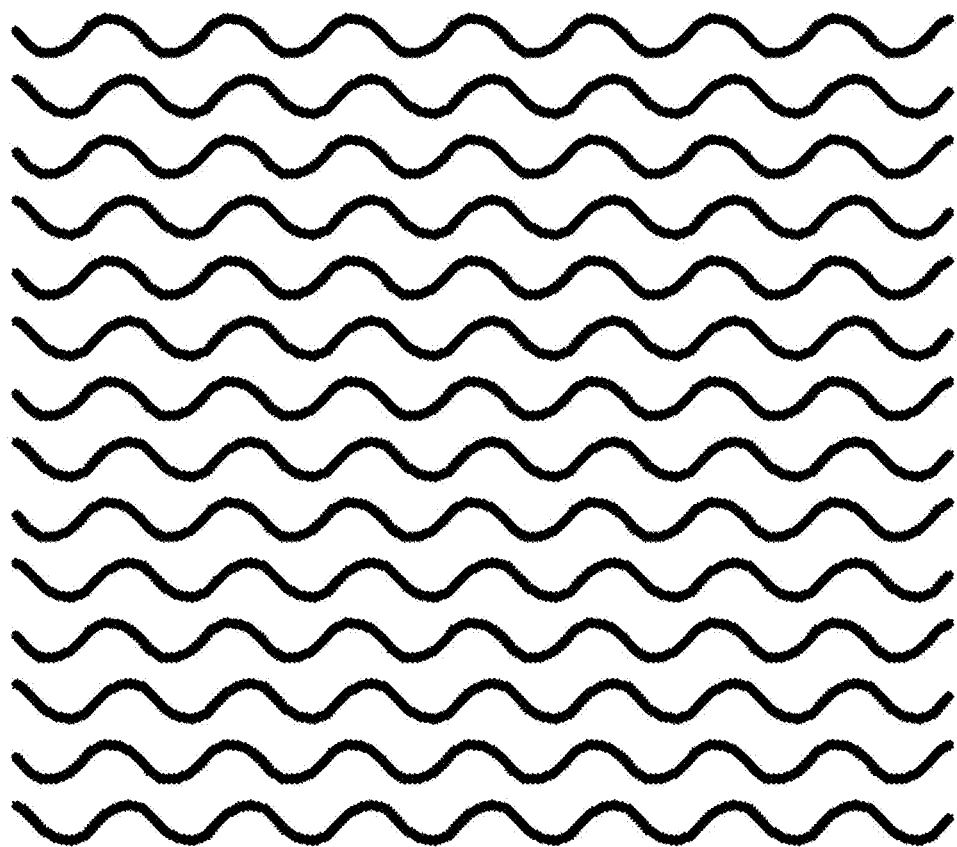
Figure 4C:
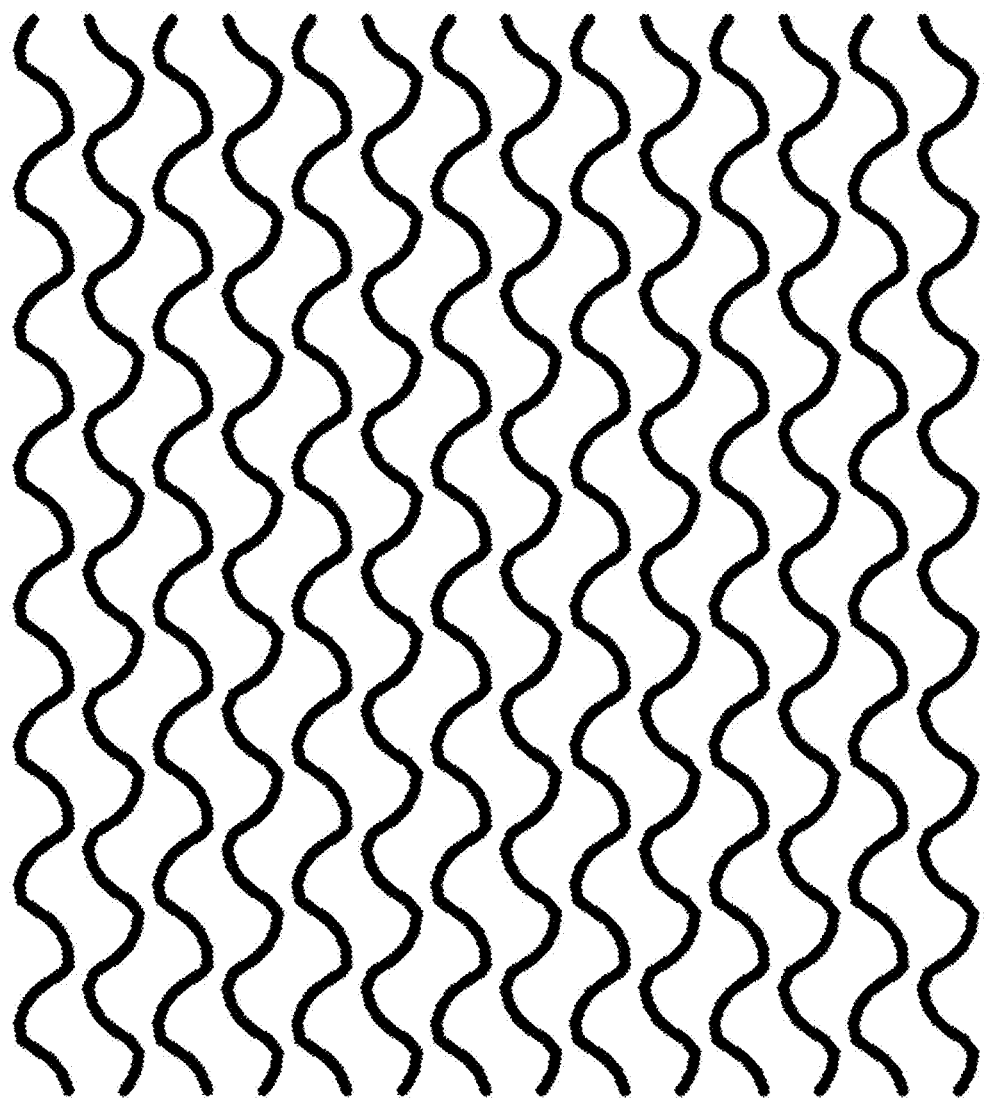

FIGS. 4A-4C illustrate examples of sets of eight curves, each forming a two-dimensional slice for infill. Notably, the implicit representation for each set of eight curves may be represented using only 35 parameters:
 (i) zHeight
 (ii) [$t\_min_1$, $t\_max_1$] ... [$t\_min_8$, $t\_max_8$] (16 parameters total)
 (iii) $offsetIdx_1$ ... $offsetIdx_8$ (8 parameters total)
 (iv) xyScale
 (v) 2dTransformation (9 parameters total)

The zHeight parameter defines the height of the two-dimensional slice. The [$t\_min_1$, $t\_max_1$] ... [$t\_min_8$, $t\_max_8$] parameters collectively define the t bounds for the eight curves. The $offsetIdx_1$ $offsetIdx_8$ parameters collectively define the X offsets for the eight curves. The xyScale parameter is a scaling factor that defines the density of the curves (e.g., how tightly spaced adjacent curves are). The 2dTransformation parameter defines an affine spatial transformation for the set of curves, such as a translation and/or rotation, based on a 3×3 2D affine transformation matrix generally formed of 9 numbers.

Of course, it will be appreciated that the above example and parameters are simply one example, and different or additional parameters may be used to define the profile at a two-dimensional slice. It will also be appreciated that while the example incorporates eight curves, any number of curves may be employed with the present invention.

Notably, the set of curves illustrated in FIGS. 4B and 4C are based on the same Gyroid structure but differ from the set illustrated in FIG. 4A in being associated with different values of zHeight (e.g., different two-dimensional slices of the Gyroid structure).

As discussed herein, the present invention may utilize Gyroid infill geometries by storing the parameters of the implicit functional representation of the Gyroid structure, rather than using piecewise representation. Such data storage based on implicit representation drastically reduces the amount of data required to represent the Gyroid geometry, compared to data storage based on piecewise representation.

Figure 5B:
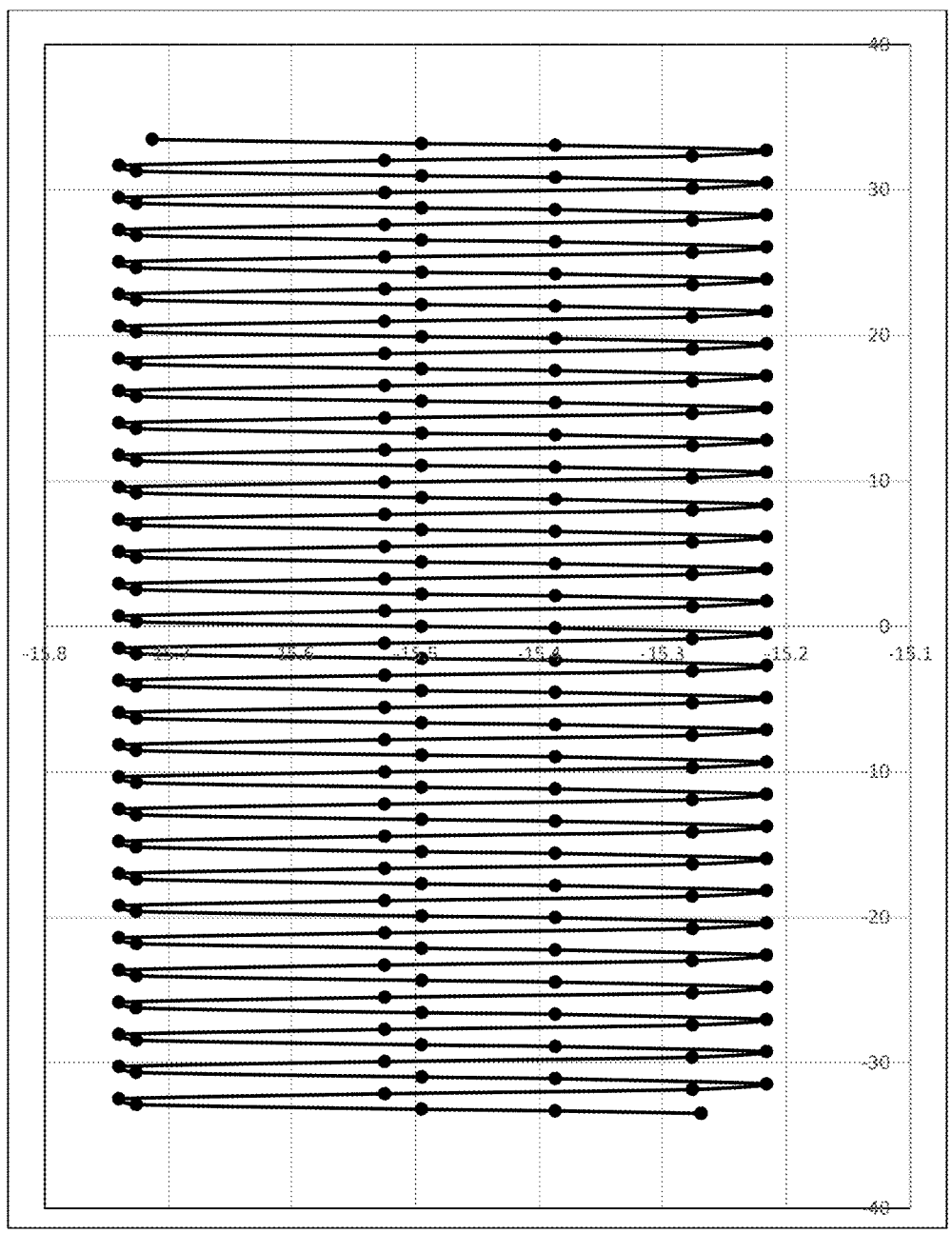
FIG. 5B illustrates piecewise segments for the curve based on the X-Y data points.

FIGS. 5A and 5B illustrate an example of a Gyroid curve stored in piecewise representation. In this example, the Gyroid curve is represented by 214 X-Y points defining piecewise segments, thereby collectively requiring 428 parameters. FIG. 5A illustrates the set of X-Y points defining the piecewise segments. In this example, each piecewise segment is based on the linear path between two successive X-Y points. FIG. 5B illustrates the curve formed by linking such piecewise segments.

FIGS. 6A and 6B illustrate examples of storage of the Gyroid curve in implicit representation, such as within a 3D production file, according to one aspect of the present invention. As shown in FIG. 6A, the Gyroid curve is stored in implicit representation based on zHeight, xyScale, offsetIdx, 2dTransformation, and tBounds (i.e., t_min and t_max), which total only 14 parameters rather than the 428 parameters in the case of piecewise representation.

FIG. 6B illustrates another example of storage of a Gyroid curve in implicit representation, which incorporates additional, optional parameters to provide further flexibility and options. This data further adds a pathType parameter allowing for different Gyroid (or other geometric) patterns to be pre-stored and selected. For instance, multiple Gyroid curve types may be pre-defined, distinguishable using an identifier (e.g., "GyroidCurveV1","GyroidCurveV2", etc.). This implicit representation example also adds stepSize and minStepSize parameters which may be used as discretization parameters when ultimately discretizing the curve during 3D part production.

More significantly, the number of parameters under the implicit representation does not increase with a longer curve, since the longer curve may be represented by updating the existing parameters (e.g., values of tBounds and/or 2dTransformation). Conversely, for piecewise representation, the number of required parameters increases linearly with the length of the curve, since such representation requires storing additional piecewise segments to define the additional length.

(ii) Schwarz Diamond

Figure 7A:
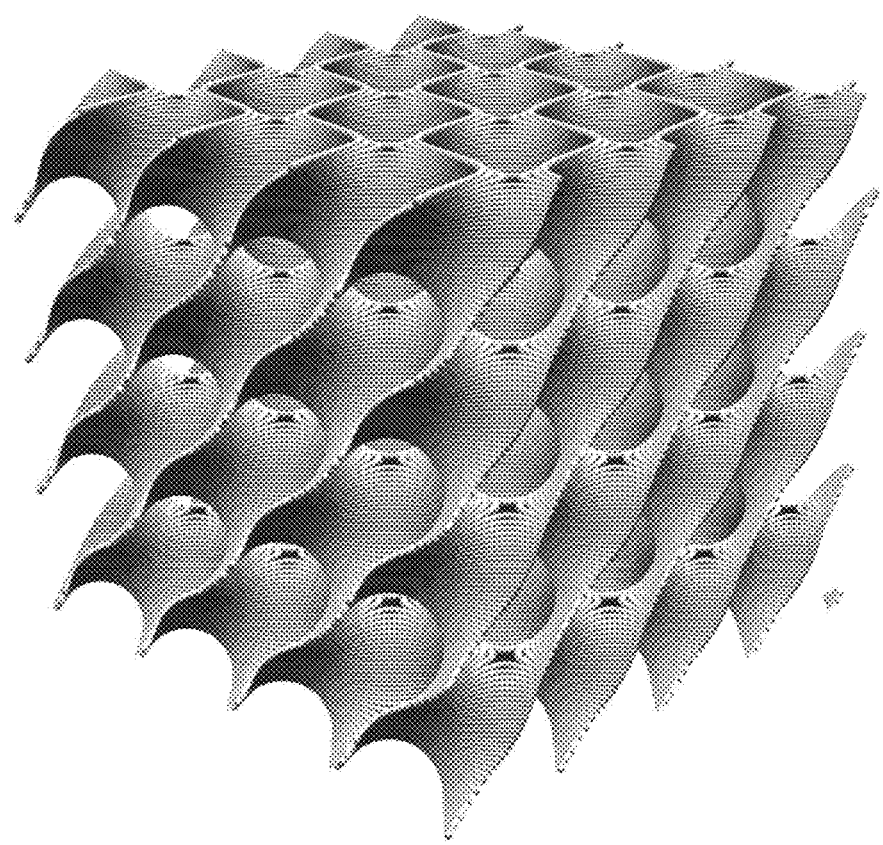
FIG. 7A illustrates a Schwarz Diamond structure that may be used to define an infill pattern for producing a 3D part.
Figure 7B:
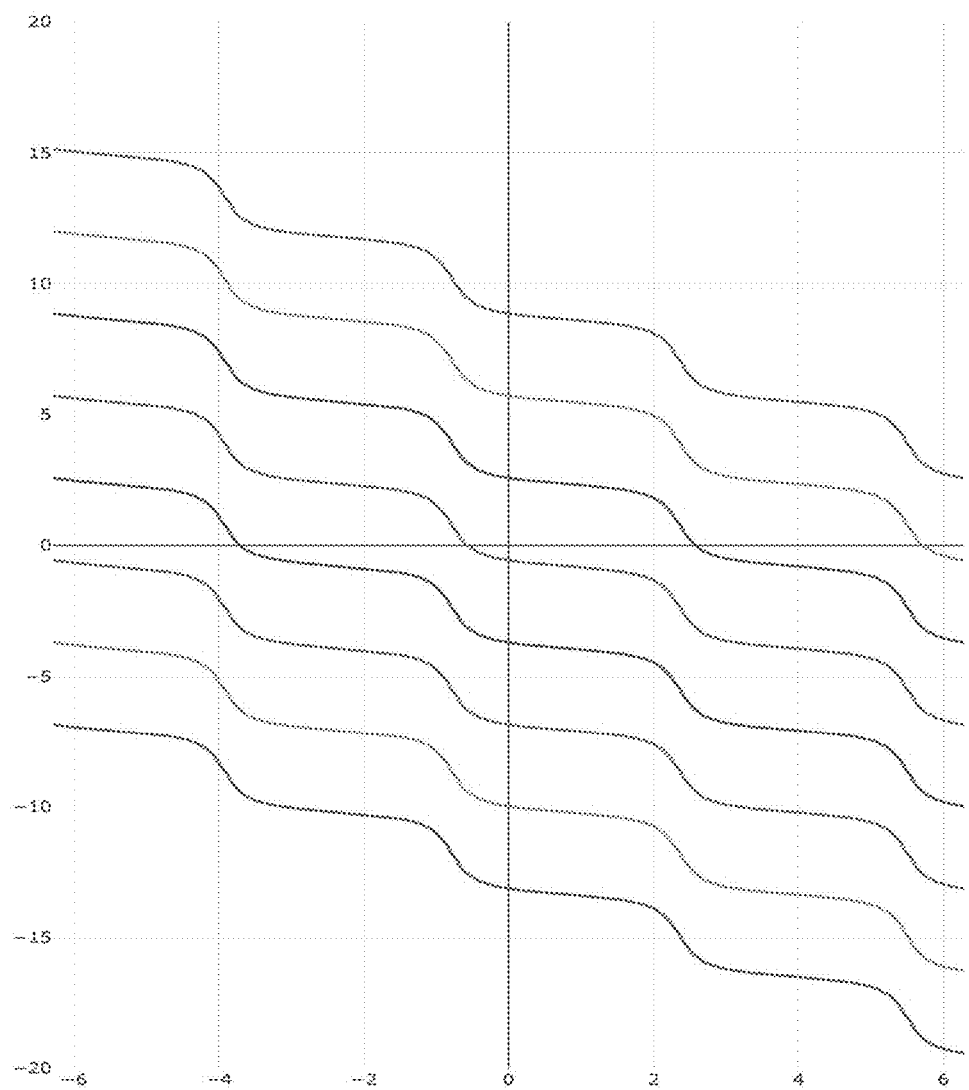
FIGS. 7B-7D illustrate examples of sets of curves forming two-dimensional slices for infill, in accordance with one embodiment.
Figure 7C:
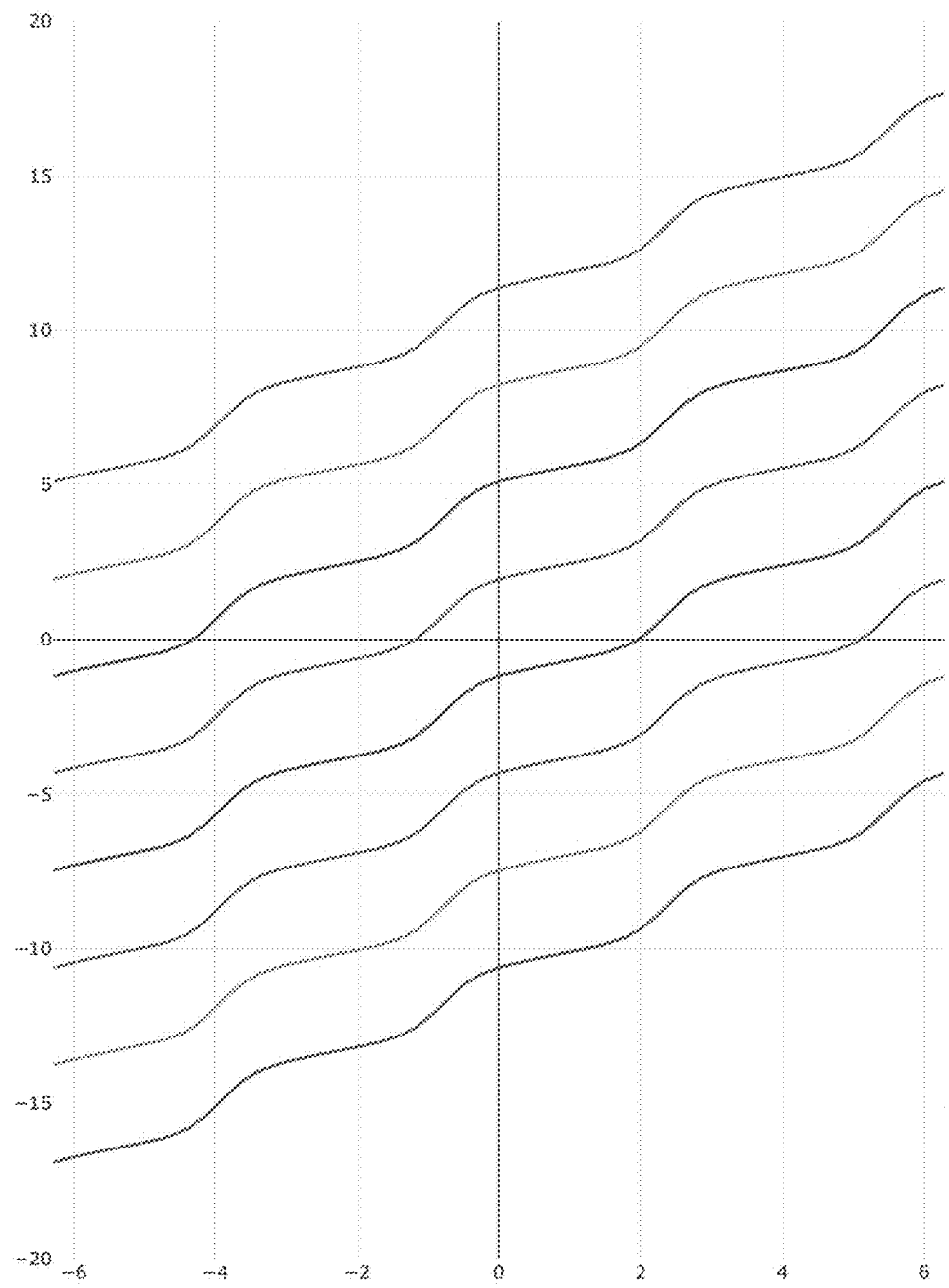
Figure 7D:
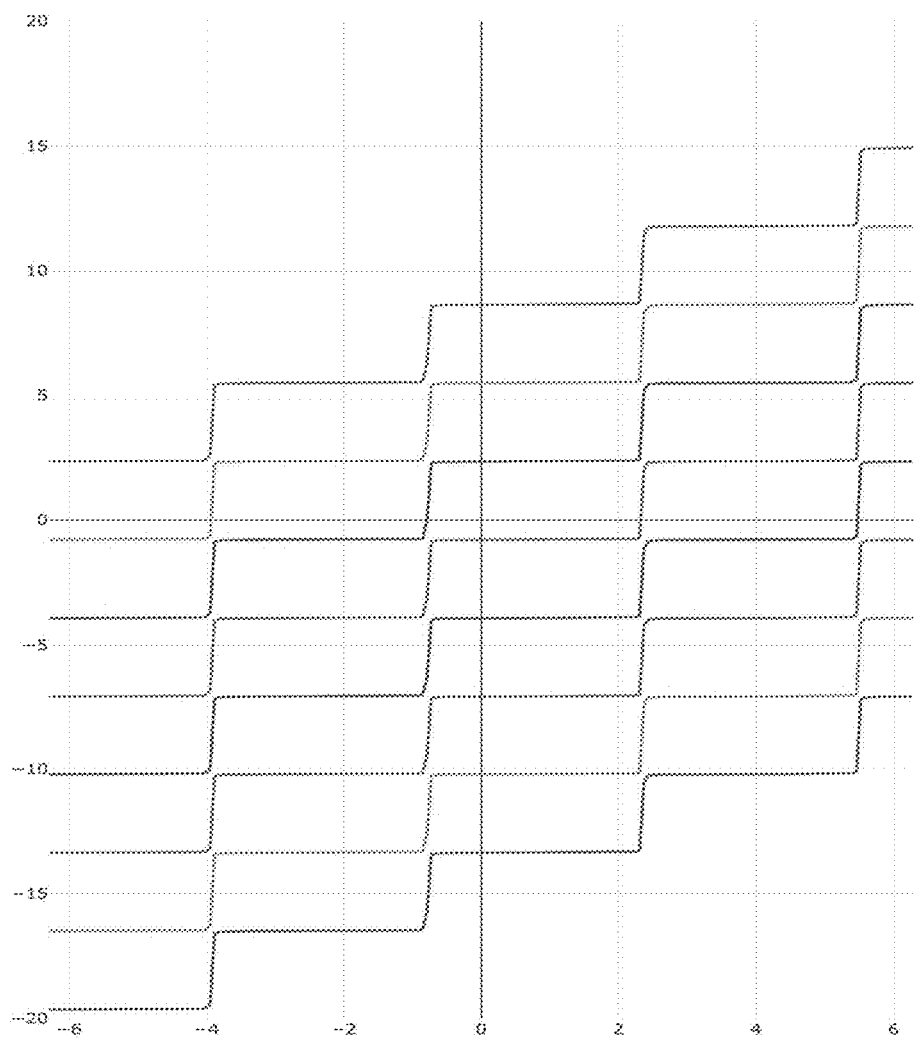

A Schwarz Diamond is another example of a geometric structure that may be used for the present invention. The Schwarz Diamond is another non-self-intersecting triply periodic minimal surface (TPMS), and therefore similar to Gyroid in usefulness for use with the present invention. FIG. 7A illustrates an example of a Schwarz Diamond structure.

Like a Gyroid, a Schwarz Diamond may also be defined according to a closed-form mathematical equation. For instance, the three-dimensional geometric structure of a Schwarz Diamond may be defined as the solution to the following equation:

$$\sin(x) \times \sin(y) \times \sin(z) + \sin(x) \times \cos(y) \times \cos(z) + \cos(x) \times \sin(y) \times \cos(z) + \cos(x) \times \cos(y) \times \sin(z) = 0$$

Similar to the Gyroid, a two-dimensional slice for the Schwarz Diamond profile may be resolved by solving the Schwarz Diamond equation for a particular height z.

(iii) Other Geometric Structures

A similar methodology may be applied to curvilinear geometry other than Gyroid and Schwarz Diamond geometries. Examples of other geometries that may be used in the present invention include, but are not limited to, other trigonometric infills, or any other path geometry that may be represented as a mathematical equation. For instance, various other triply periodic minimal surfaces have closed-form representations, and are included in the context of the present invention. These geometries include, but are not limited to, Schwarz P, Scherk's Tower, Scherk's Surface 1, Scherk's Surface 2, Neovius, Schoen IWP, and P W Hybrid.

More broadly, the present invention may be implemented using any geometry that may be parameterized by a small number of parameters, including geometry which is not strictly derived from a closed-form mathematical equation. Any geometry which may be expressed via algorithmic means as a function of a small number of parameters may be used with the present invention. For example, such geometries include, but are not limited to, plane-filling functions (e.g., Hilbert curves), spiral curves, zig-zags, honeycombs, and accordions.

It will be appreciated that each geometry may have differing usefulness, depending on the complexity of the underlying geometry compared to the number of parameters required to define the geometry.

Advantages of Storing Geometrical Structures Based on Closed-Form Mathematical Expressions Various advantages of the present invention will now be explained. As described herein, one aspect of the present invention relates to utilizing 3D production files which store motion commands according to closed-form functional representations rather than piecewise segments.

A first benefit that the present invention may provide is a reduction in file size of a 3D production file. The storage of motion commands based on implicit representation, rather than piecewise representation, reduces the required amount of data needed to represent the motion command. Therefore, for the same part, a 3D production file having motion commands defined based on implicit representation rather than on piecewise representation may be more efficiently stored and transmitted, resulting in an improved user experience. For example, a reduced file size reduces the time to transmit the 3D production file over the Internet or other network (or copy the 3D production file onto physical media). A reduced file size also reduces the amount of storage space on the production device required to store the print file.

While the savings in file size is dependent on the particular geometries being represented, the inventor has recognized that file size savings generally increases in proportion to volume of the corresponding 3D part. In general, the savings in file size is inversely correlated with surface area. For example, a 3D part printed using mostly long curves (e.g., a large cube) may enjoy greater savings in file size, compared to a 3D part having a high surface area and low volume (e.g., a heat sink) printed using many short curves. That is, the savings in file size may scale linearly with length of the curves forming the motion commands.

A second benefit that the present invention may provide is a reduction in time required to generate the 3D production file. By storing parameters of the geometric structures implicitly, an operation for discretizing such structures into piecewise segments can be avoided during the file generation process. Even in the case where only a subset of the motion commands in the 3D production file are based on an implicit representation, the file generation process still avoids a need to discretize those implicit representations.

While discretization may still be required during the actual 3D production operation (as described in further detail below), the avoidance of the discretizing process at the 3D production file stage may also allow any future improvements in discretization (e.g., more efficient processing and/or more refined discretization) to be exploited without the need to re-create existing 3D production files. That is, any future improvements in discretization may be loaded into the 3D production apparatus at a later date and may be used on existing 3D production files utilizing implicit representations, whereas such ability may not be possible on 3D production files utilizing piecewise representation (since discretization has already been performed).

A third benefit that the present invention may provide is the ability to set a production quality level (e.g., resolution such as 3D print resolution) at the time of production, rather than when creating the 3D production file. Information stored in a 3D production file using implicit representation has not been discretized at a particular quality level (e.g., resolution). Therefore, with information stored in implicit representation in accordance with the present invention, a user may defer a selection of quality level (e.g., resolution) until the time of production, and may avoid the need to otherwise re-create a 3D production file if a different quality level is desired (which may be required in the case of piecewise representation).

A fourth benefit that the present invention may provide is increased efficiency in simulating the 3D production process. Since the motion commands are stored as implicit representations rather than as piecewise segments, a process for simulating the 3D production process may more efficiently reproduce the process by mathematical calculations, rather than traversing the sequence of piecewise segments. As such simulation process may be used to determine an estimate of time and/or material consumption for the 3D printing, the present invention provides for a more rapid estimate by mathematically calculating the length of the curves and the time needed to traverse them via component motion.

A fifth benefit that the present invention may provide is the use of compression to even further reduce the file size of the 3D production file. That is, the storage of motion commands using implicit representation does not prevent the application of file compression methodologies to the file.

3D Printer Apparatus

Figure 8A:
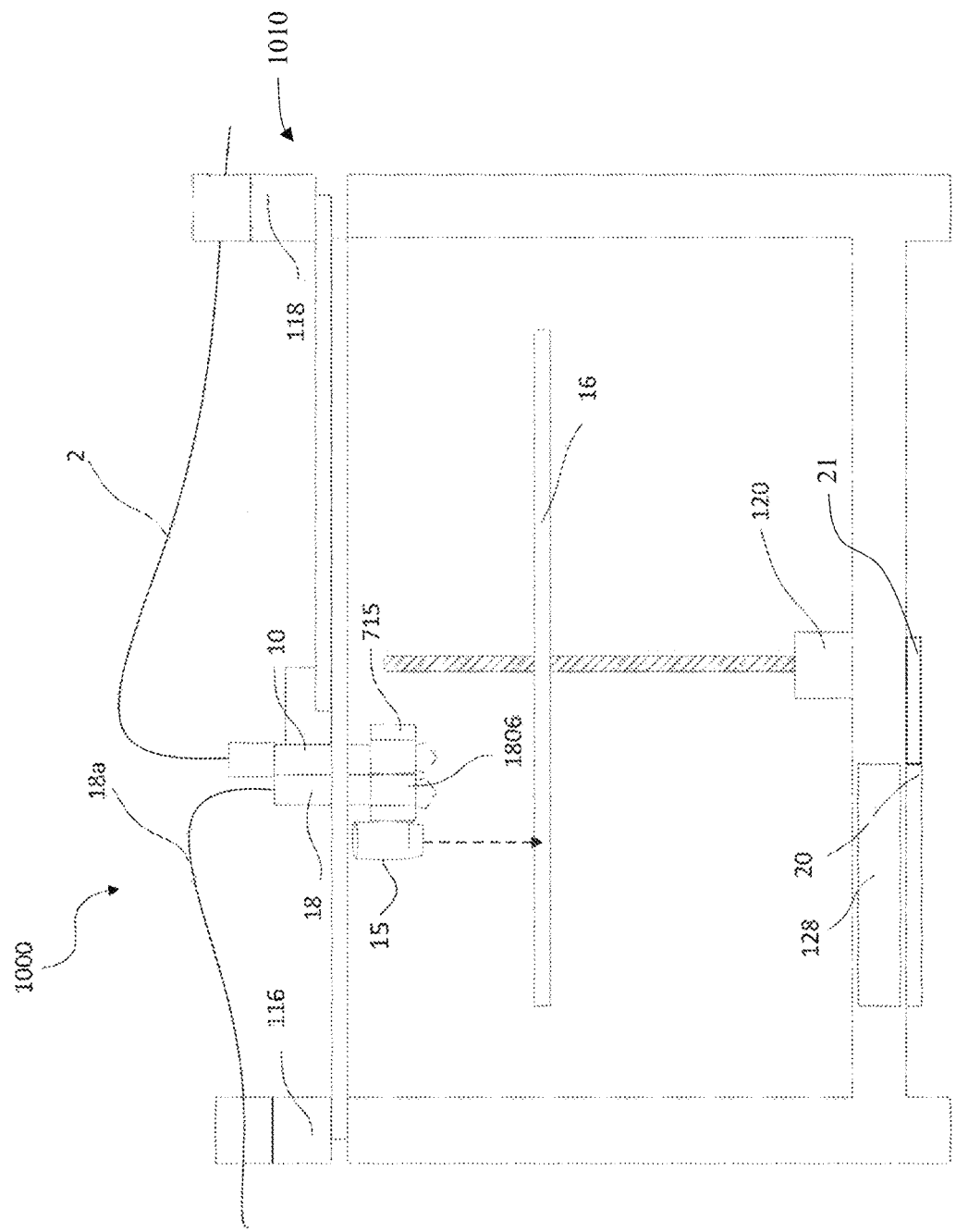
FIGS. 8A and 8B illustrate an apparatus, in accordance with one embodiment.
Figure 8B:
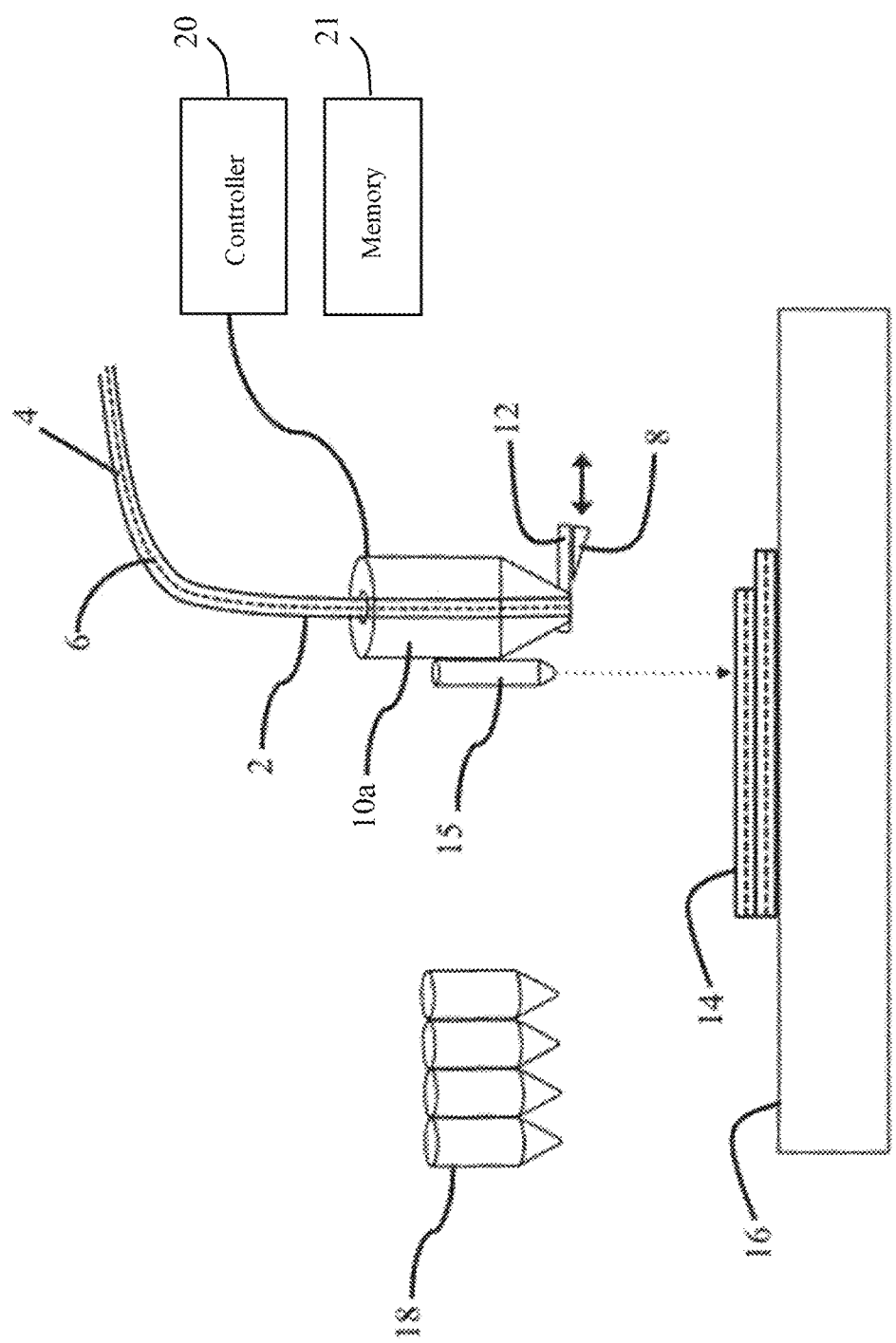

FIGS. 8A-8B illustrate an apparatus 1000 in accordance with one embodiment of the invention. The apparatus 1000 includes one or more controllers 20, one or more memories 21, and one or more print heads 10, 18. For instance, one head 10 may deposit a metal or fiber reinforced composite filament 2, and another head 18 may apply pure or neat matrix resin 18a (thermoplastic or curing). In the case of the filament 2 being a fiber reinforced composite filament, such filament (also referred to herein as continuous core reinforced filament) may be substantially void free and include a polymer or resin that coats, permeates or impregnates an internal continuous single core or multistrand core. It should be noted that although the print head 18 is shown as an extrusion print head, "fill material print head" 18 as used herein includes optical or UV curing, heat fusion or sintering, or "polyjet", liquid, colloid, suspension or powder jetting devices (not shown) for depositing fill material. It will also be appreciated that a material bead formed by the filament 10a may be deposited as extruded thermoplastic or metal, deposited as continuous or semi-continuous fiber, solidified as photo or UV cured resin, or jetted as metal or binders mixed with plastics or metal, or are structural, functional or coatings. The fiber reinforced composite filament 2 (also referred to herein as continuous core reinforced filament) may be a push-pulpreg that is substantially void free and includes a polymer or resin 4 that coats or impregnates an internal continuous single core or multistrand core 6. The apparatus includes heaters 715, 1806 to heat the print heads 10, 18, respectively so as to facilitate deposition of layers of material to form the object 14 to be printed. A cutter 8 controlled by the controller 20 may cut the filament 2 during the deposition process in order to (i) form separate features and components on the structure as well as (ii) control the directionality or anisotropy of the deposited material and/or bonded ranks in multiple sections and layers. As depicted, the cutter 8 is a cutting blade associated with a backing plate 12 located at the nozzlet outlet. Other cutters include laser, high-pressure air or fluid, or shears. The apparatus 1000 may also include additional non-printing tool heads, such as for milling, SLS, etc.

The apparatus 1000 includes a gantry 1010 that supports the print heads 10, 18. The gantry 1010 includes motors 116, 118 to move the print heads 10, 18 along X and Y rails in the X and Y directions, respectively. The apparatus 1000 also includes a build platen 16 (e.g., print bed) on which an object to be printed is formed. The height of the build platen 16 is controlled by a motor 120 for Z direction adjustment. Although the movement of the apparatus has been described based on a Cartesian arrangement for relatively moving the print heads in three orthogonal translation directions, other arrangements are considered within the scope of, and expressly described by, a drive system or drive or motorized drive that may relatively move a print head and a build plate supporting a 3D printed object in at least three degrees of freedom (i.e., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

FIG. 8B depicts an embodiment of the apparatus 1000 applying the filament 2 to build a structure. In one embodiment, the filament 2 is a metal filament for printing a metal object. In one embodiment, the filament 2 is a fiber reinforced composite filament (also referred to herein as continuous core reinforced filament) may be a push-pulpreg that is substantially void free and includes a polymer or resin 4 that coats or impregnates an internal continuous single core or multistrand core 6.

The filament 2 is fed through a nozzlet 10*a* disposed at the end of the print head 10, and heated to extrude the filament material for printing. In the case that the filament 2 is a fiber reinforced composite filament, the filament 2 is heated to a controlled push-pultrusion temperature selected for the matrix material to maintain a predetermined viscosity, and/or a predetermined amount force of adhesion of bonded ranks, and/or a surface finish. The push-pultrusion may be greater than the melting temperature of the polymer 4, less than a decomposition temperature of the polymer 4 and less than either the melting or decomposition temperature of the core 6.

After being heated in the nozzlet 10*a* and having its material substantially melted, the filament 2 is applied onto the build platen 16 to build successive layers 14 to form a three dimensional structure. One or both of (i) the position and orientation of the build platen 16 or (ii) the position and orientation of the nozzlet 10 are controlled by a controller 20 to deposit the filament 2 in the desired location and direction. Position and orientation control mechanisms include gantry systems, robotic arms, and/or H frames, any of these equipped with position and/or displacement sensors to the controller 20 to monitor the relative position or velocity of nozzlet 10*a* relative to the build platen 16 and/or the layers 14 of the object being constructed. The controller 20 may use sensed X, Y, and/or Z positions and/or displacement or velocity vectors to control subsequent movements of the nozzlet 10*a* or platen 16. The apparatus 1000 may optionally include a laser scanner 15 to measure distance to the platen 16 or the layer 14, displacement transducers in any of three translation and/or three rotation axes, distance integrators, and/or accelerometers detecting a position or movement of the nozzlet 10*a* to the build platen 16. The laser scanner 15 may scan the section ahead of the nozzlet 10*a* in order to correct the Z height of the nozzlet 10*a*, or the fill volume required, to match a desired deposition profile. This measurement may also be used to fill in voids detected in the object. The laser scanner 15 may also measure the object after the filament is applied to confirm the depth and position of the deposited bonded ranks. Distance from a lip of the deposition head to the previous layer or build platen, or the height of a bonded rank may be confirmed using an appropriate sensor.

Various 3D-printing aspects of the apparatus 1000 are described in detail in U.S. Patent Application Publication No. 2019/0009472, which is incorporated by reference herein in its entirety.

In the present invention, the controller 20 may be configured to receive a 3D print file containing commands for operating the apparatus 1000 to produce the 3D part, a subset of motion commands defined based on parameters of a closed-form functional representation of a geometric structure. The controller 20 may contain functionality for converting the closed-form functional representations stored in the 3D print file into discrete piecewise segments (e.g., lines and arcs). Using such piecewise segments, the controller 20 may in turn control the motion components (e.g., motors 116, 118) with discrete motor commands based on the piecewise segments.

It will be appreciated that in one embodiment, the functionality for converting the closed-form functional representations into piecewise segments may be pre-stored in the apparatus 1000. In one embodiment, such functionality may be stored in the 3D production file received by the apparatus 1000, and may be loaded into the controller 20 from the 3D production file. By storing such functionality (e.g., in object or executable code form, or in source code form) in the 3D production file, an apparatus 1000 that does not otherwise have such functionality pre-stored may still successfully process the 3D production file and generate the piecewise segments from the closed-form functional representations for 3D production.

Figure 9:
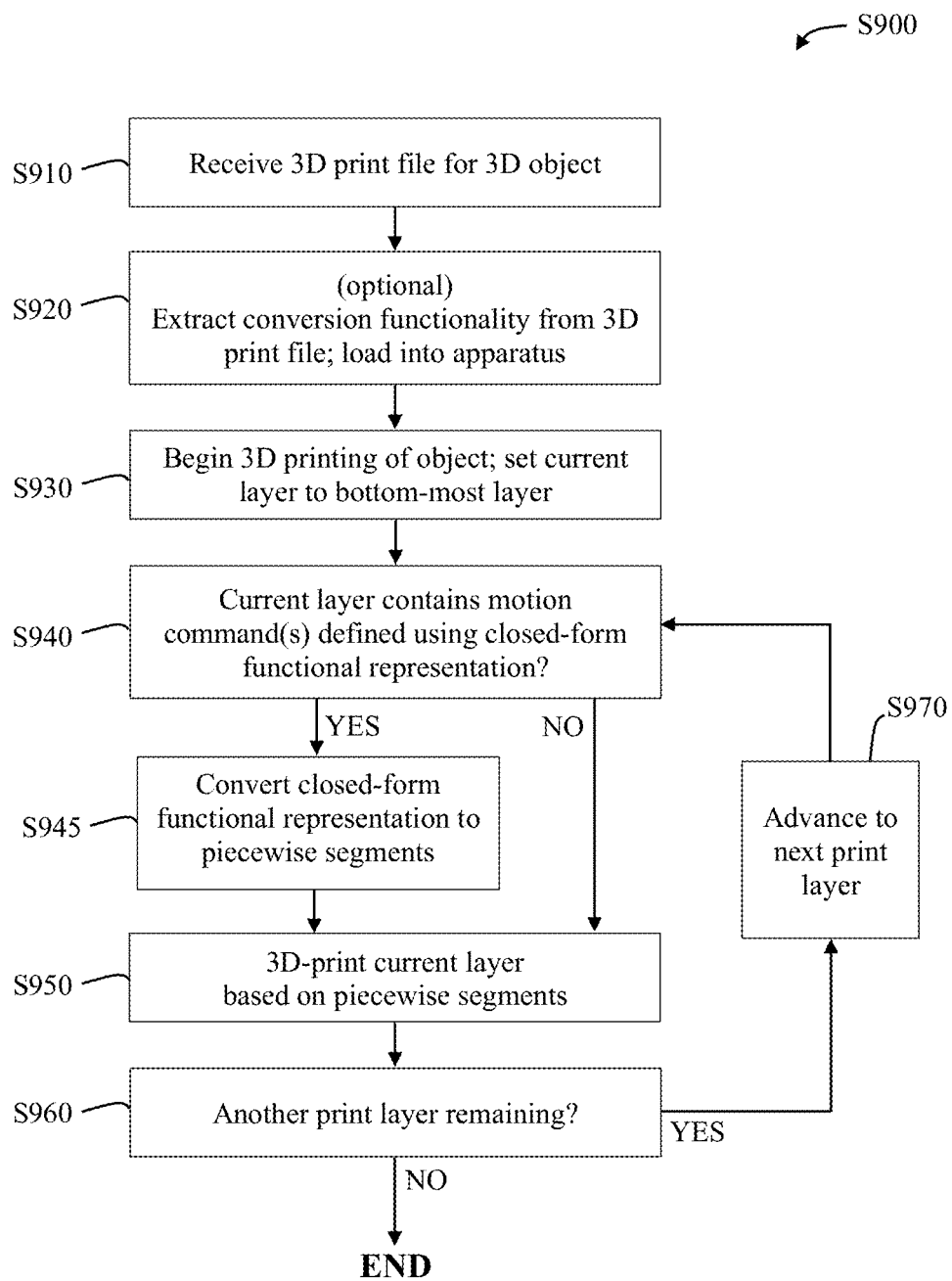
FIG. 9 is a flow chart for performing 3D-printing of an object, in accordance with one embodiment.

FIG. 9 illustrates an operation S900 for producing a 3D part, using a 3D production file in which at least a subset of the motion commands are defined using a closed-form functional representation.

In step S910, the controller 20 receives a 3D print file relating to a 3D object to be printed. The controller 20 may load the print commands within the 3D print file into memory 21. The print commands may include motion commands, where at least a subset of the motion commands are defined using a closed-form functional representation.

In step S920, if the 3D print file contains functionality (e.g., source, object, and/or executable code) for performing conversion of closed-form functional representations into discrete piecewise segments, the controller 20 optionally loads the functionality into memory 21. Alternatively, the controller 20 may rely on existing conversion functionality within the apparatus 1000 for performing such conversion.

In step S930, the controller 20 initiates the 3D-printing operation of the object, setting the current layer to be printed as the bottom-most print layer.

In step S940, the controller 20 determines whether the print commands for the current print layer includes one or more motion commands defined using closed-form functional representation. If the print commands for the current print layer includes such motion command(s) defined using closed-form functional representation, the controller 20 executes the conversion functionality to convert the closed-form functional representation to piecewise segments (e.g., linear and/or arcuate). The controller 20 may perform such conversion by solving the closed-form functional representation (e.g., such as the approaches described for the Gyroid and Schwarz Diamond examples above) for the height z corresponding to the particular print layer, and then discretizing the geometric profile into segments. By resolving the closed-form functional representation, the controller 20 determines the curve profiles for the print layer. By discretizing the curve profiles into piecewise segments, the controller 20 produces command instructions for iterative motion control, thus allowing the apparatus 1000 (which is already configured to interpret motion commands based on piecewise segments) to execute these instructions in the same manner as motion commands originally defined in piecewise representation form.

In step S950, the controller 20 controls the motors 116, 118 with discrete motor commands based on the piecewise segments, and causes the print head(s) 10, 18 to print the current layer. It will also be appreciated that steps S945 and S950 may be performed concurrently, such that the closed-form functional representation is converted to piecewise segments in real-time during the printing of the current layer.

In step S960, the controller 20 determines whether another print layer remains to be printed for the object. If another print layer remains to be printed, the operation proceeds to step S970. If the current print layer is the final print layer, the operation ends.

In step S970, the controller 20 increments the current print layer to the next layer, thereby advancing to the next layer. Generally, the next layer is the successive layer upwards in height. The operation then returns to step S940.

It will be appreciated that although the commands herein focus on motion, the present invention is not limited thereto. For instance, the present invention broadly includes more generic positional commands defining a feature of the 3D part to be produced. As one example, the present invention is applicable to a pixel/voxel-based process (e.g., DLP, binderjet, etc), where an image to be printed and which is projected onto base material may be defined according to an implicit representation.

Therefore, it will be appreciated that any implementation for 3D part production that endeavors to store production information according to implicit representation rather than piecewise representation, is in keeping with the spirit of the present invention.

Other Embodiments

It will be appreciated that the present invention is applicable to other 3D production environments, beyond 3D printing, for forming 3D parts. As discussed above, the present invention is applicable to a CNC machining production process. In addition to the fused filament fabrication (FFF) manner of 3D printing and additive manufacturing described herein, the present invention is also applicable to non-FFF style 3D part production. The present invention is additionally applicable to laser-based 3D printing (e.g., laser cutting). For example, the print commands for laser-based 3D printing are similar to those in FFF-style 3D printing, and the present invention may include laser-based 3D printing based on 3D production files containing positional commands based on implicit representations. The present invention is further applicable to directed energy deposition (DED), stereolithography (SLA), digital light processing (DLP), and binderjet type 3D printing apparatuses, where, e.g., a boundary contour and/or a volumetric kernel stored in such a 3D printing file may be represented using an implicit representation. For example, the present invention may utilize a pixel/voxel-based approach, where an "image" defining the contour(s) may be defined using an implicit representation. In turn, print commands may be generated from the implicit representations to control the components of the respective apparatuses. For instance, an implicit representation within the 3D production file may be converted to print command(s) which include information corresponding to a position or orientation of an emitted energy beam for a DED apparatus, a position or orientation of an emitted light or laser beam for an SLA, DLP, or laser-cutting apparatus, a position to selectively deposit a liquid binder on a thin layer of powder for a binderjet apparatus, and a position of a machining tool for a CNC apparatus.

Incorporation by reference is hereby made to U.S. Pat. Nos. 10,076,876, 9,149,988, 9,579,851, 9,694,544, 9,370,896, 9,539,762, 9,186,846, 10,000,011, 10,464,131, 9,186,848, 9,688,028, 9,815,268, 10,800,108, 10,814,558, 10,828,698, 10,953,609, U.S. Patent Application Publication No. 2016/0107379, U.S. Patent Application Publication No. 2019/0009472, U.S. Patent Application Publication No. 2020/0114422, U.S. Patent Application Publication No. 2020/0361155, U.S. Patent Application Publication No. 2020/0371509, and U.S. Provisional Patent Application No. 63/138,987 in their entireties.

Although this invention has been described with respect to certain specific exemplary embodiments, many additional modifications and variations will be apparent to those skilled in the art in light of this disclosure. For instance, while reference has been made to an X-Y Cartesian coordinate system, it will be appreciated that the aspects of the invention may be applicable to other coordinate system types (e.g., radial). It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. An apparatus comprising:
   at least one processor; and
   at least one memory,
   wherein the at least one memory stores computer-readable instructions which, when executed by the at least one processor, cause the processor to:
      receive a 3D production file, the 3D production file containing at least one positional command defined based on an implicit representation, the at least one positional command including at least one parameter of the implicit representation,
      generate at least one tool command based on the parameters of the implicit representation, and control a position of a tool, based on the generated at least one tool command, to produce at least a portion of a 3D part corresponding to the 3D production file,
wherein the implicit representation is a closed-form mathematical representation represented by a mathematical expression, and the at least one parameter of the implicit representation includes at least one parameter of the mathematical equation.

2. The apparatus of claim 1, wherein the closed-form mathematical representation is a representation of a geometric structure.

3. The apparatus of claim 2, wherein the geometric structure is a Gyroid.

4. The apparatus of claim 2, wherein the geometric structure is a Schwarz Diamond.

5. The apparatus of claim 2, wherein the generating at least one tool command includes:
generating a profile of the geometric structure, based on the at least one parameter of the closed-form functional representation, and
generating the at least one tool command based on the generated profile of the geometric structure.

6. The apparatus of claim 2, wherein the generating at least one tool command includes:
generating a profile of the geometric structure, based on the at least one parameter of the closed-form mathematical representation,
generating at least one piecewise segment based on the generated profile of the geometric structure, and
generating the at least one tool command based on the generated at least one piecewise segment.

7. The apparatus of claim 2, wherein the 3D part is produced on a layer-by-layer basis, and
wherein the generating at least one tool command includes, for each print layer:
generating a profile of the geometric structure for the print layer, based on the at least one parameter of the closed-form mathematical representation,
generating at least one piecewise segment based on the generated profile of the geometric structure, and
generating the at least one tool command based on the generated at least one piecewise segment.

8. The apparatus of claim 2, wherein the computer-readable instructions are first computer-readable instructions,
wherein the 3D production file further contains second computer-readable instructions which, when executed by the processor, cause the processor to generate a profile of the geometric structure, and
wherein the first computer-readable instructions which, when executed by the processor, cause the processor to store the second computer-readable instructions in the at least one memory.

9. The apparatus of claim 1, wherein the at least one positional command includes a motion command.

10. The apparatus of claim 1, wherein the at least one tool command includes a motor command.

11. The apparatus of claim 1, wherein the at least one tool command includes information corresponding to a position to deposit 3D printing material for a 3D printer apparatus.

12. The apparatus of claim 1, wherein the at least one tool command includes information corresponding to a position or orientation of an emitted energy beam for a directed energy deposition (DED) apparatus.

13. The apparatus of claim 1, wherein the at least one tool command includes information corresponding to a position or orientation of an emitted light beam for a stereolithography (SLA) apparatus.

14. The apparatus of claim 1, wherein the at least one tool command includes information corresponding to a position or orientation of an emitted light beam for a digital light processing (DLP) apparatus.

15. The apparatus of claim 1, wherein the at least one tool command includes information corresponding to a position to deposit a liquid binder on powder for a binderjet apparatus.

16. The apparatus of claim 1, wherein the at least one tool command includes information corresponding to a position of a machining tool for a CNC apparatus.

17. The apparatus of claim 1, wherein the at least one tool command includes information corresponding to a position or orientation of an emitted laser beam for a laser cutting apparatus.

18. An apparatus comprising:
at least one processor; and
at least one memory,
wherein the at least one memory stores computer-readable instructions which, when executed by the at least one processor, cause the processor to:
receive a 3D production file, the 3D production file containing at least one positional command defined based on an implicit representation, the at least one positional command including at least one parameter of the implicit representation,
generate at least one tool command based on the parameters of the implicit representation, and
control a position of a tool, based on the generated at least one tool command, to produce at least a portion of a 3D part corresponding to the 3D production file,
wherein the implicit representation is a closed-form algorithmic representation, and the at least one parameter of the implicit representation includes at least one parameter of the closed-form algorithmic representation.

19. A method comprising:
receiving, by at least one processor, a 3D production file, the 3D production file containing at least one positional command defined based on an implicit representation, the at least one positional command including at least one parameter of the implicit representation;
generating, by the at least one processor, at least one tool command based on the parameters of the implicit representation; and
controlling, by the at least one processor, a position of a tool, based on the generated at least one tool command, to produce at least a portion of a 3D part corresponding to the 3D production file,
wherein the implicit representation is a closed-form mathematical representation represented by a mathematical expression, and the at least one parameter of the implicit representation includes at least one parameter of the mathematical equation.

20. The method of claim 19, wherein the closed-form mathematical representation is a representation of a geometric structure.

21. The method of claim 20, wherein the geometric structure is a Gyroid.

22. The method of claim 20, wherein the geometric structure is a Schwarz Diamond.

23. The method of claim 20, wherein the generating at least one tool command includes:

generating a profile of the geometric structure, based on the at least one parameter of the closed-form mathematical representation, and generating the at least one tool command based on the generated profile of the geometric structure.

24. The method of claim 20, wherein the generating at least one tool command includes:

generating a profile of the geometric structure, based on the at least one parameter of the closed-form mathematical representation, generating at least one piecewise segment based on the generated profile of the geometric structure, and generating the at least one tool command based on the generated at least one piecewise segment.

25. The method of claim 20, wherein the 3D part is produced on a layer-by-layer basis, and wherein the generating at least one tool command includes, for each print layer:

generating a profile of the geometric structure for the print layer, based on the at least one parameter of the closed-form functional representation, generating at least one piecewise segment based on the generated profile of the geometric structure, and generating the at least one tool command based on the generated at least one piecewise segment.

26. The method of claim 20, wherein the computer-readable instructions are first computer-readable instructions, wherein the 3D production file further contains second computer-readable instructions which, when executed by the at least one processor, cause the at least one processor to generate a profile of the geometric structure, and wherein the first computer-readable instructions which, when executed by the at least one processor, cause the processor to store the second computer-readable instructions in the at least one memory.

27. The method of claim 19, wherein the at least one positional command includes a motion command.

28. The method of claim 19, wherein the at least one tool command includes a motor command.

29. The method of claim 19, wherein the at least one tool command includes information corresponding to a position to deposit 3D printing material for a 3D printer apparatus.

30. The method of claim 19, wherein the at least one tool command includes information corresponding to a position or orientation of an emitted energy beam for a directed energy deposition (DED) apparatus.

31. The method of claim 19, wherein the at least one tool command includes information corresponding to a position or orientation of an emitted light beam for a stereolithography (SLA) apparatus.

32. The method of claim 19, wherein the at least one tool command includes information corresponding to a position or orientation of an emitted light beam for a digital light processing (DLP) apparatus.

33. The method of claim 19, wherein the at least one tool command includes information corresponding to a position to deposit a liquid binder on powder for a binderjet apparatus.

34. The method of claim 19, wherein the at least one tool command includes information corresponding to a position of a machining tool for a CNC apparatus.

35. The method of claim 19, wherein the at least one tool command includes information corresponding to a position or orientation of an emitted laser beam for a laser cutting apparatus.

36. A method comprising:

receiving, by at least one processor, a 3D production file, the 3D production file containing at least one positional command defined based on an implicit representation, the at least one positional command including at least one parameter of the implicit representation;

generating, by the at least one processor, at least one tool command based on the parameters of the implicit representation; and controlling, by the at least one processor, a position of a tool, based on the generated at least one tool command, to produce at least a portion of a 3D part corresponding to the 3D production file, wherein the implicit representation is a closed-form algorithmic representation, and the at least one parameter of the implicit representation includes at least one parameter of the closed-form algorithmic representation.

* * * * *